United States Patent

[11] 3,623,501

[72] Inventor James J. Reimbold
  Overland Park, Kans.
[21] Appl. No. 54,287
[22] Filed July 13, 1970
[45] Patented Nov. 30, 1971
[73] Assignee A. B. Chance Company
  Centralia, Mo.

[54] CONTINUOUS HYDRAULIC HOSE STRUCTURE FOR TELESCOPIC BOOM ASSEMBLY
  12 Claims, 10 Drawing Figs.
[52] U.S. Cl. ................................................... 137/355.17
[51] Int. Cl. ................................................... B65h 75/36
[50] Field of Search ........................................ 137/355.17,
  355.18, 355.19, 355.20, 355.22, 355.23, 355.24,
  355.25, 355.26, 355.27, 355.28, 615; 285/302

[56] References Cited
UNITED STATES PATENTS

| | | | |
|---|---|---|---|
| 2,868,508 | 1/1959 | Cowan | 137/355.23 X |
| 2,948,306 | 8/1960 | Kuraeff | 137/615 UX |
| 3,162,253 | 12/1964 | Curtis | 137/355.16 X |
| 3,213,877 | 10/1965 | May et al. | 137/355.16 |
| 3,391,875 | 7/1968 | Hamrick | 137/355.23 X |
| 3,399,545 | 9/1968 | Anderson et al. | 285/302 X |
| 3,399,909 | 9/1968 | Ambrose | 137/615 X |
| 3,427,051 | 2/1969 | White et al. | 285/302 X |
| 3,431,937 | 3/1969 | Hettlinger et al. | 137/355.17 |
| 3,439,700 | 4/1969 | Preston | 137/615 X |
| 3,461,906 | 8/1969 | Eckerle | 137/355.17 |

Primary Examiner—Samuel Scott
Attorney—Schmidt, Johnson, Hovey & Williams

ABSTRACT: A telescopic boom assembly having stacked hydraulic hose structure disposed in configuration in the assembly and mounted for removal therefrom as a unit. The hose package is adapted for use on extensible boom structure having at least a pair of telescoping boom sections provided with a fluid-actuated extension cylinder and a source of pressurized fluid for operating the same. A plurality of elongated conduit means, each of which is provided with a fluid-conveying passage, are mechanically interconnected in vertically stacked relationship to present a continuous conduit assembly presenting a plurality of separate passages in superimposed relationship. The conduit assembly is constructed and arranged in the boom structure in disposition to prevent flexing thereof in a vertical plane, and clamp means readily accessible from one end of the boom structure secures the conduit assembly to the boom sections in a serpentine, closed loop configuration with the individual loops thereof lying in generally horizontal planes and confined by the sidewalls of a corresponding boom section to preclude kinking of the conduits during extension and retraction of the boom sections and consequent folding and unfolding of the looped portions of the conduits. Appropriate coupling means secure opposite ends of the conduits to the cylinder and the fluid source respectively. A second conduit assembly having a plurality of conduits presenting hydraulic fluid-conveying passages also disposed in vertically stacked, superimposed relationship is normally placed side-by-side with the first conduit assembly to deliver fluid to the outer end of the outermost movable boom section for operating controls or power tools. The second conduit assembly is normally provided with at least four superimposed conduits disposed in vertically stacked, continuous, serpentine loop configuration and secured by appropriate clamps in the same manner as the first-mentioned conduit assembly.

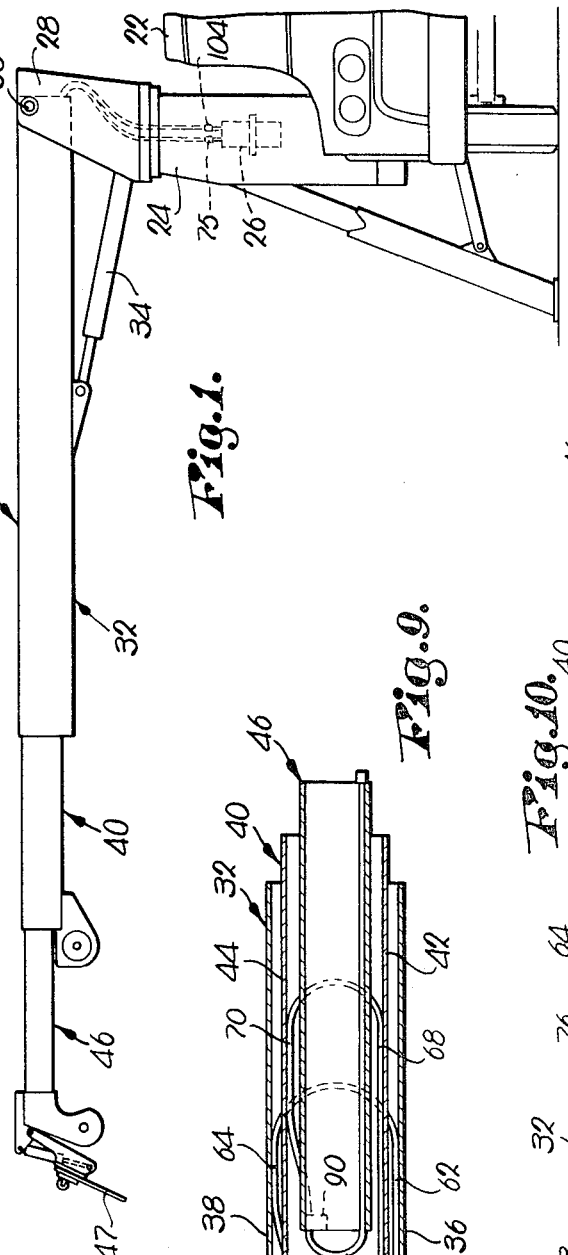
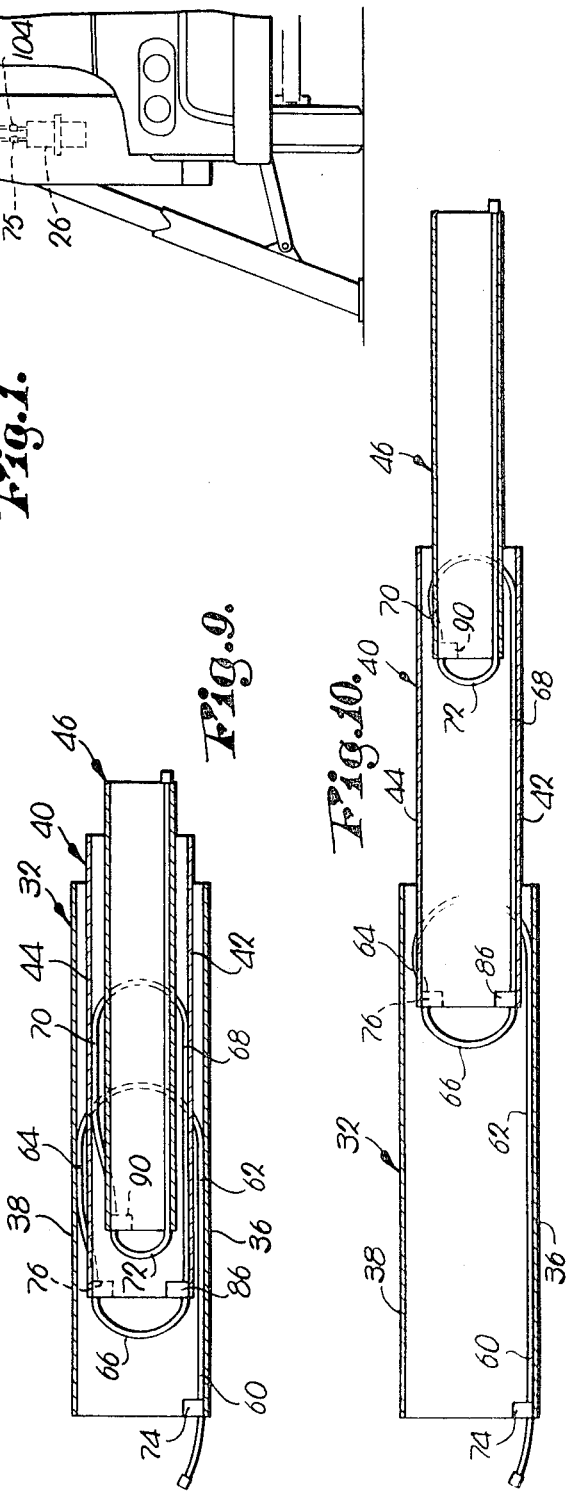
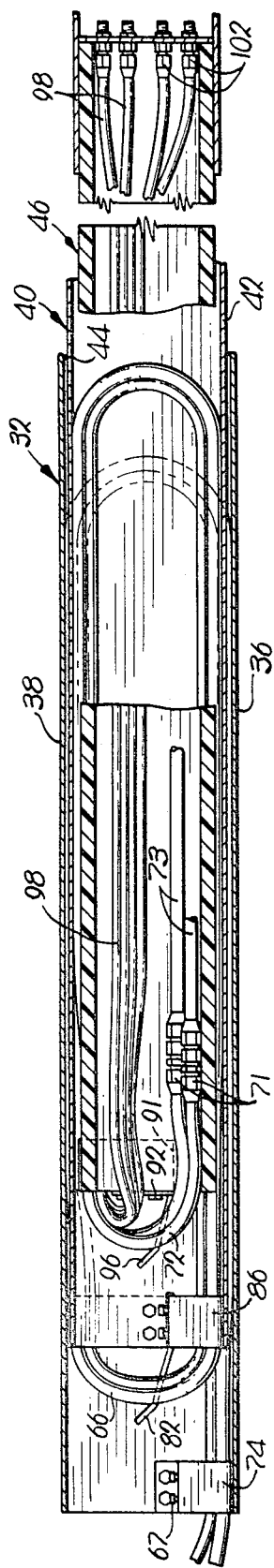
PATENTED NOV 30 1971
3,623,501
SHEET 1 OF 2
INVENTOR
James J. Reimbold
BY
ATTORNEYS.

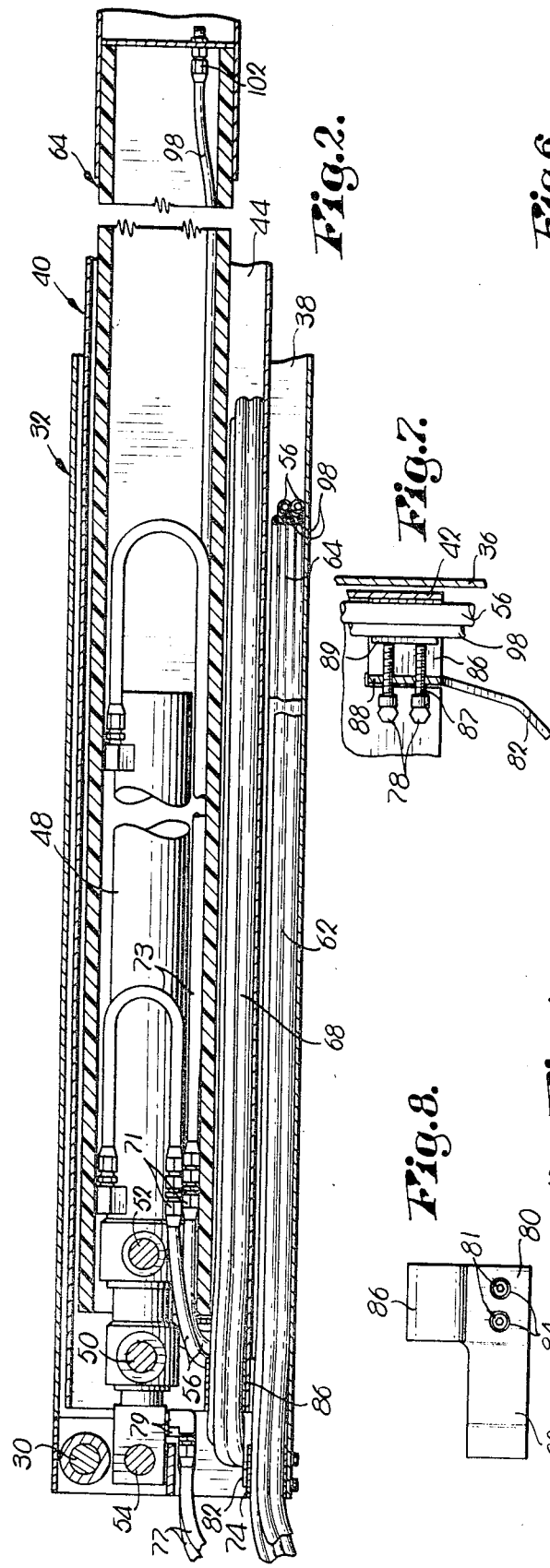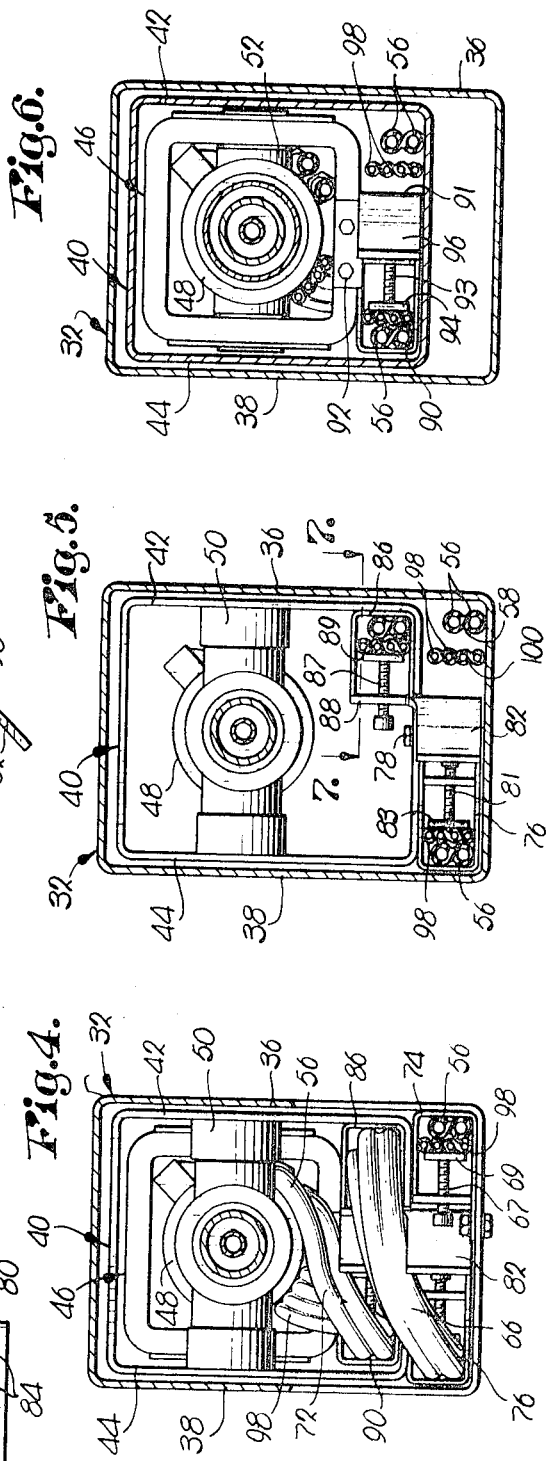

CONTINUOUS HYDRAULIC HOSE STRUCTURE FOR TELESCOPIC BOOM ASSEMBLY

This invention relates to construction or utility vehicle equipment provided with extensible boom apparatus rotatable about a vertical axis and, more specifically, to a continuous hydraulic hose structure useful therein for conveying pressurized fluid from a source to a boom extension cylinder, as well as to controls or power tools operable from or at the outermost end of the boom section which is movable the farthest from the mount for the boom apparatus.

Construction or utility vehicles having rotatable telescopic booms have achieved widespread acceptance within the last decade because they provide safe, reliable and economical means such as derricks for picking up objects; digging holes and holding poles as digger-derricks; or in aerial devices for permitting workmen to reach elevated areas. It is conventional for the telescopic booms to include one or more hydraulic cylinders for extending and retracting the boom sections, as well as numerous hydraulic line couplings permitting fluid-actuated devices located at the end of the outer boom or tools or controls operable from a personnel bucket to be actuated at locations remote from the source of pressurized operating fluid regardless of the extent of relative telescoping of the boom sections. In the case of hydraulic cylinder-actuated telescopic boom sections where the pressurized operating fluid has been directed to and returned through hoses, it has heretofore been necessary to provide hose reels within the sections to prevent entanglement of the hydraulic hose as one of the sections is extended and retracted relative to the other section. Such mechanism for maintaining the hydraulic hose in proper disposition within the boom sections occasionally requires repair or maintenance which necessitates disassembling the boom to gain access to the mechanism. Substantial labor is involved in this procedure thus contributing substantially to the overall maintenance costs of extensible boom apparatus.

The present invention eliminates all need for hose reels and other moving parts within the telescoping boom sections by providing a hose assembly which is disposed in one or more continuous loops within the boom sections. The conduits defining respective fluid passages of the assembly are arranged in a confined area in vertically stacked, superimposed relationship to prevent vertical flexing of the assembly. A minimum number of clamps are disposed adjacent the ends of the telescoping sections to hold the assembly against undue flexing in a horizontal direction which would cause kinking of the conduits. These clamps are located for easy access from one end of the boom structure without disassembly of the boom and can be quickly loosened to permit the entire assembly to be pulled from the inboard end of the boom.

It is, therefore, the primary object of the present invention to provide a continuous hydraulic hose structure for a telescopic boom apparatus which can be removed for maintenance or replacement purposes without disassembly of the boom sections.

As a corollary to the above object, it is an aim of the invention to provide hydraulic hose structure for a telescopic boom apparatus which requires no reels, pulleys, or other moving parts to be located interiorly of the boom sections.

Another object of the invention is to provide a hydraulic hose structure for an extensible boom which can be utilized with either a single telescoping section, or a plurality of such sections.

A further important object of the invention is to provide a hose conduit assembly for telescopic boom structure of a construction or utility vehicle wherein the conduits are located in stacked relationship and have intermediate looped portions located with opposed parallel stretches confined between the sidewalls of the respective boom sections so that upon extension and retraction of the outer boom section or sections, the sidewalls guide the hoses and prevent kinking thereof, particularly in view of the fact that each looped portion of the hose assembly is clamped to an adjacent boom section for movement therewith.

An important aim of the invention is also to provide a hydraulic hose structure for an extensible boom providing an unlimited number of conduit passages to the movable boom section for supplying hydraulic fluid to hydraulic cylinders, power-operated devices or power tools operably associated with the boom assembly without the need for any hose reels or other moving parts to be located within the boom sections.

An object of the invention is also to provide a hydraulic hose structure for an extensible boom which is constructed with conduits defining a plurality of fluid passages and disposed in superimposed, stacked relationship in a vertical plane within a confined area of the boom sections to preclude vertical flexing of the hose assembly.

Yet another aim of the invention is a hydraulic hose structure for an extensible boom which locates all of the necessary hose clamps adjacent the inboard ends of the boom sections to permit their rapid and easy removal when it is necessary to withdraw the hose structure.

In the drawings:

FIG. 1 is a side elevational view of a three-stage hydraulic boom mounted upon a construction or utility vehicle;

FIG. 2 is an enlarged, vertical, longitudinal, cross-sectional view through the extensible boom apparatus of FIG. 1 with the apparatus being rotated 180° from the position illustrated in FIG. 1;

FIG. 3 is a horizontal, cross-sectional view of the apparatus shown in FIG. 2 with the hydraulic extension cylinder being removed for purposes of illustration;

FIG. 4 is an end elevational view of the boom apparatus shown in FIG. 2 with portions being broken away for purposes of illustration;

FIG. 5 is a vertical, cross-sectional view through the first boom section adjacent the end of the latter with the third boom section being removed for purposes of illustration;

FIG. 6 is a cross-sectional view through the end of the second boom section with the third boom section being seen in elevation;

FIG. 7 is a cross-sectional view taken along line 7—7 of FIG. 5;

FIG. 8 is a side elevational view of the clamp illustrated in FIG. 7;

FIG. 9 is a schematic, horizontal, cross-sectional view illustrating the relationship of the conduit assembly with the three boom sections when the latter are in their retracted positions; and FIG. 10 is a schematic, horizontal, cross-sectional view illustrating the relationship of the conduit assembly with the three boom sections when the latter are in their extended positions.

Referring initially to FIG. 1 wherein the extensible boom apparatus in the form of a derrick is designated generally by the numeral 20, it is seen that the apparatus 20 is shown as being mounted on the chassis of a vehicle such as a truck 22 in a conventional manner. The truck 22 presents a base member for the boom apparatus 20 and includes an upright turret support 24. A rotatable fluid manifold 26 is disposed within the support 24 and provides a source of fluid control medium for the apparatus 20.

The apparatus 20 includes a rotatable turret 28 on support 24 having a cross shaft 30 thereon for mounting a first hollow boom section 32. A two-stage hydraulic cylinder 34 is coupled with the boom section 32 and also with the turret 28 to provide means for moving the apparatus 20 into various vertical dispositions. Referring additionally to FIG. 4, it is seen that the boom section 32 is hollow and has a generally rectangular cross-sectional configuration with opposed vertical sidewalls 36 and 38.

The boom section 32 telescopically receives a second hollow boom section 40 also of generally rectangular cross section and having opposed sidewalls 42 and 44. Similarly, the second boom section 40 telescopically receives a third boom section 46 which is constructed from an insulating material and is also hollow. The end of the apparatus 20 adjacent the turret 28 is referred to herein as the "inboard" end.

For purposes of illustration only, a pair of fluid-operated claw arms, defining a pole holder 47, are shown on the "outboard" end of the extensible boom section 40 as being illustrative of one type of hydraulically actuated mechanism which requires that pressurized hydraulic fluid be supplied thereto. The two-stage hydraulic cylinder 48, best illustrated in FIG. 2, is disposed for effecting telescopic movement of the third section 46 relative to the second section 40 as well as telescopic movement of the latter relative to the first section 32 in a two-step extension. For this purpose, a trunnion-type coupling 52 connects the cylinder 48 with the section 46, while similar couplings 50 and 54 operably join respective telescoped cylinder rods to corresponding sections 40 and 32. It is to be noted that the first boom section 32 has a substantially larger cross-sectional dimension than the second boom section 40, and the same is true of the latter relative to the third boom section 46. Also, the sections 32, 40 and 46 are positioned with their central longitudinal axes in vertically spaced relationship to define open areas therebetween for purposes to be made clear hereinafter.

Referring now to FIG. 5, it is seen that a pair of conduits 56 having a combined vertical cross-sectional dimension greater than their individual horizontal cross-sectional dimensions are mechanically interconnected by a common wall 58 and disposed in vertically stacked relationship to present a conduit assembly having a pair of passages in spaced, superimposed relationship to each other. Referring additionally to FIG. 9, the assembly presented by conduits 56 includes a connecting stretch 60 which extends along the sidewall 36 of the first section 30 and merges into an intermediate portion which is disposed in a continuous loop within the open area between the sections 32 and 40, with opposed stretches 62 and 64 of the loop lying alongside the interior of the opposed sidewalls 36 and 38. An end portion 66 of the loop extends from the sidewall 38 of the first section 32 to the opposite sidewall 42 of the second section 40. This end portion 66 then merges into a second continuous loop within the open area between the sections 46 and 40 with the loop having stretches 68 and 70 disposed alongside the interior of the opposed sidewalls 42 and 44. An end portion 72 of this second loop extends upwardly into the third boom section 46. A first pair of connections 71 couple one end of the conduits 56 to a pair of hose lengths 73, the latter being connected directly with the cylinder 48. A second pair of connections, one of which is designated 75 and shown in FIG. 1, couple the opposite ends of the conduits 56 to the source of fluid medium through manifold 26. A second pair of conduits 77 are also coupled with the fluid medium through the manifold 26 and are coupled with the end of the inner rod of cylinder 48 by connections 79.

A clamp component 74 at the end of the section 32 adjacent the turret 28 holds the connecting stretch 60 proximal the sidewall 36 by virtue of clamping screws 67 and plate 69. Restraining means is also provided for maintaining the stretches 62 and 64 of the first loop adjacent the sidewalls 36 and 38 as the second section 40 moves relative to the first section 32. Included as part of the restraining means is a U-shaped clamp element 76 which is carried by the second section 40 at the inboard end of the latter and secured thereto by a pair of bolts 78, visible in FIG. 7. Clamping screws 81 hold a plate 83 in engagement with the conduit assembly to maintain the stretch 64 adjacent the sidewall 38. An end wall 80, also a part of the restraining means, spans the distance between the legs of the clamp 76 and is integral with and merges into an arm 82 which projects outwardly from the inboard end of the section section 40. A pair of openings 84 in the wall 80 provide access to the clamping screws 81.

Restraining means for maintaining the stretches 68 and 70 of the second loop adjacent the sidewalls 42 and 44 includes a second U-shaped clamp element 86 which projects from an upstanding wall 88. The wall 88 is integral with the wall 80 and projects through an appropriate slot in the bottom of the second boom section 40. The clamp element 86 includes screws 87 and clamping plate 89. Also a part of the latter mentioned restraining means is a second clamp component 90 which is carried on the third boom section 46 at the inboard end of the latter by bolts 92. The component 90 has a pair of clamping screws 93 and a plate 94 which maintain the stretch 70 of the second continuous loop adjacent the sidewall 44. The clamp component 90 is also rigid with an end wall 91 (shown in phantom in FIG. 3) which is disposed in the same relationship to the component 90 as is the wall 80 to the clamping element 76. An arm 96 integral with the wall 91 projects outwardly from the inboard end of section 46.

A second conduit assembly is disposed in side-by-side relationship to the assembly presented by conduits 56. This second assembly is presented by four conduits 98 disposed in vertically stacked, superimposed relationship and mechanically interconnected by common sidewalls 100 intermediate each pair of adjacent conduits. It is to be noted that the conduits 98, like the conduits 56, have a combined vertical cross-sectional dimension greater than their individual horizontal cross-sectional dimensions. The assembly presented by conduits 98 is disposed in two continuous loops with stretches of each loop lying along the inside of the opposed sidewalls of the respective boom sections in the same manner as previously described for the assembly of conduits 56. Similarly, the assembly of conduits 98 is held adjacent the sidewalls of the respective boom sections by clamping elements 76 and 86, and clamp components 74 and 90. A plurality of connections 102 couple the conduits 98 at one end with the claw arms 47 and a similar plurality of connections, one of which is designated 104 in FIG. 1, couple the opposite ends of the conduits 98 to the fluid control medium through manifold 26.

In operation with the two conduit assemblies presented by conduits 56 and 98 disposed in the manner described, the second boom section 40 is movable, upon actuation of the cylinder 48, into the extended illustrated schematically in FIG. 10. Similarly, introduction of hydraulic fluid into the second stage of the cylinder 48 moves the third boom section 46 outwardly relative to the second section 40 into the extended position illustrated in FIG. 10. Movement of each of the boom sections 40 and 46 outwardly away from the section 32 reduces the total circumferential length of the closed loops of the two conduit assemblies, although the stretches 62, 64, 68 and 70 of the first conduit assembly and the corresponding stretches of the second conduit assembly remain spaced and parallel in disposition adjacent opposed sidewalls of the respective sections. Because of the open areas between the bottoms of the boom sections within which the loops of the conduit assemblies are positioned each of the sections 40 and 46 is free to move without engagement of the corresponding loop therebeneath.

From FIG. 4 it is seen that the arms 82 and 96 provide a support structure for the end portions 66 and 72 of the first and second loops of the assembly presented by conduits 56 as well as the corresponding end portions of the loops of the assembly presented by conduits 98. Thus, the end portions of the conduit assemblied are held above the surfaces of the adjacent boom sections which reduces wear of the assemblies and also prevents the end portions from rubbing against and becoming entangled with an underlying stretch of the continuous loops. Once each of the boom sections has been moved into its extended position the flow of fluid through the conduits 98 may be commenced to operate a power-actuated unit such as the claw arms 47 of the device positioned at the end of the section 46. This device, for example, may be conveniently used for holding a pole within a hole in the ground in proper upright disposition.

When either of the sections 40 and 46 is to be retracted, the flow of hydraulic fluid through the appropriate stage of the cylinder 48 is reversed and as the third section 46 is received within the section 40 and the latter within the section 32, the loops of the two conduit assemblies presented by conduits 56 and 98 again assume the configuration illustrated in FIG. 9. It is to be understood that the walls 80 and 91 serve as blocking elements to prevent the stretches 62 and 68 of the two loops of the assembly presented by conduits 56 and the corresponding stretches of the loops of the assembly presented by conduits 98 from moving outwardly away from the adjacent sidewalls of the respective boom sections. This blocking function of the walls 80 and 91 is best understood with reference to FIGS. 5 and 6 from which it can be seen that any movement of the assembly of conduits 98 away from the sidewalls 36 or 42 will result in engagement of this assembly with the leading edge of either the end wall 80 or the end wall 91. In this manner, any significant undesirable flexing of the conduit assemblies in a horizontal plane is effectively prevented to preclude kinking thereof. Since there is a pulling force exerted upon the conduit assemblies at the locations of the clamping element 76 and the clamping component 90 the stretches of the assembly loops adjacent the sidewalls 38 and 44 are maintained in position adjacent these sidewalls without the requirement for blocking elements such as walls 80 and 91.

It is an important aspect of the present invention to have the conduits 56 and 98 joined together in a substantially vertical plane since such a construction reduces the number of conduits which are relatively movable and at the same time imparts sufficient added rigidity to the conduit assembly to preclude vertical flexing of the same.

When it is desired to remove the conduit assemblies for maintenance or replacement purposes, the connections 102 on the conduits 98 are loosened as are the connections 71 on the conduits 56. The bolts securing the clamp components 74 and 90 are then removed as are the bolts which secure the clamp elements 76 and 86. The complete assemblies of the conduits 56 and 98 are then removed from the boom sections by pulling on the end portions 66 and 72, and the corresponding end portions of the assembly of conduits 98, from the inboard end of the apparatus 20. Since the clamping elements 76 and 86 and the clamp components 74 and 90 are removed with the conduit assemblies proper positioning of these members relative to the assemblies is always assured and repositioning of the same within the boom sections is substantially simplified.

From the foregoing description it is apparent that the extensible boom apparatus of the present invention incorporates structure for delivering hydraulic fluid to the power devices of the boom without the requirement of hose reels or any other moving mechanical parts being located within the boom sections. While the apparatus of the invention has been described with reference to an extensible boom having three relatively movable boom sections, it is to be understood that the invention will also find application in an extensible boom having any number of relatively movable boom sections. Furthermore, it is to be emphasized that any number of power devices can be used with the invention, the power claw arms 47 being merely illustrative. In this respect, although a derrick has been shown for illustration purposes, the invention has equal application in other extensible boom units for operating the digger or winch of a digger-derrick as well as the claw pole holding device shown, the bucket controls of an aerial device, or handheld tools operable from quick connect hydraulic line couplings terminating adjacent such bucket.

Having thus described the invention, what is claimed as new and desired to be secured by Letters Patent is:

1. In an extensible boom assembly provided with first and second boom sections disposed in telescopic relationship with one being shiftable relative to the other and provided with opposed, spaced sidewalls, structure combined with said boom assembly for delivering and returning pressurized operating device operably associated with the assembly, said structure comprising:

a plurality of elongated conduits positioned within the boom assembly and each defining a fluid conveying passage therethrough with opposite ends of the conduits terminating adjacent opposed extremities of the boom assembly; and means on the boom assembly engaging said conduits for interconnecting the latter to maintain the same in vertically stacked, superimposed relationship, said conduits having intermediate portions disposed in a continuous loop pattern with opposed, spaced stretches thereof confined between and lying alongside the interior of the opposed sidewalls of said first section.

2. Extensible boom apparatus comprising:

a base member;

means on the base member providing a source of pressurized fluid;

a first hollow boom section having opposed sidewalls and mounted on the base member;

a second boom section telescopically mounted on the first section for extensible movement relative to the latter;

a fluid-operated power device requiring a plurality of fluid connections thereto operably associated with said second boom section;

a plurality of elongated conduit means each provided with a passage;

means mechanically interconnecting said conduit means in vertically stacked relationship to present a conduit assembly having a plurality of passages in spaced, superimposed relationship to each other; and means for coupling opposite ends of said conduit means to said pressurized fluid source and said device respectively, said conduit assembly including an intermediate portion disposed in a continuous loop pattern within said first section and having stretches lying alongside the interior of the opposed sidewalls of said first section.

3. Apparatus as set forth in claim 2, wherein said elongated conduit means have a combined vertical cross-sectional dimension greater than their individual horizontal cross-sectional dimensions.

4. Apparatus as set forth in claim 2, wherein said second boom section has opposed sidewalls and is hollow, and said means on the second section for carrying said device includes a third boom section telescopically mounted on the second section for extensible movement relative to the latter, said intermediate portion continuing into a second continuous loop within said second section and having stretches lying alongside the opposed sidewalls of said second section, and said device comprises a hydraulic cylinder unit coupled with each of said sections for moving said second and third sections.

5. Apparatus as set forth in claim 2, wherein said first boom section has a larger cross-sectional dimension than said second boom section and said sections are positioned relative to each other to define an open area therebetween for placement of said continuous loop whereby movement of said second section relative to said first section occurs free of engagement with said loop.

6. Apparatus as set forth in claim 5, wherein is included clamp means for securing said loop to said second section adjacent the end of the latter nearest said base member.

7. Apparatus as set forth in claim 2, wherein is included restraining means carried by said second boom section for maintaining said assembly adjacent said opposed sidewalls as said second section moves relative to said first section.

8. Apparatus as set forth in claim 7, wherein said conduit assembly includes a connecting stretch extending from said source along one of the sidewalls of said first section and which merges with said intermediate portion, said restraining means including a clamp element for securing said assembly adjacent the other sidewall of said first section and a blocking element disposed adjacent said one sidewall for engagement with said assembly when the latter moves outwardly from said one sidewall.

9. Apparatus as set forth in claim 8, where is provided means for securing said assembly to said first section adjacent said base member and proximal said one sidewall.

10. Apparatus as set forth in claim 9, wherein said loop includes an end portion extending from said other sidewall to the side of said second section opposite said other sidewall, and further including support structure secured to said second section for maintaining said end portion in spaced relationship to an underlying one of said stretches of the loop.

11. Extensible boom apparatus comprising:
a base member;
means of the base member presenting a source of pressurized fluid;
a first hollow boom section having opposed sidewalls and mounted on the base member;
a second hollow boom section having opposed sidewalls;
a third boom section;
a fluid-operated cylinder requiring a plurality of fluid connections thereto,
said second boom section being telescopically mounted within said first boom section for extensible movement relative to the latter and said third boom section being telescopically mounted within said second boom section for extensible movement relative to the latter,
said first boom section having a larger cross-sectional dimension than said second boom section and the latter having a larger cross-sectional dimension than said third boom section, said sections being positioned relative to each other to define open areas therebetween;
a plurality of elongated conduit means each defining a fluid conveying passage;
means mechanically interconnecting said conduit means in vertically stacked relationship to present a conduit assembly having a plurality of passages in spaced superimposed relationship to each other,
said elongated conduit means having a combined vertical cross-sectional dimension greater than their individual horizontal cross-sectional dimensions,
said conduit assembly including an intermediate portion disposed in a pair of continuous loops within said open areas between said sections, each of said loops having stretches lying alongside the interior of the opposed sidewalls of said first and second boom sections respectively;
restraining means carried by said second and third sections, respectively, for maintaining said assembly adjacent the opposed sidewalls of said first and second sections as said second and third sections move relative to said first and second sections, respectively; and
means for coupling the opposite ends of said passages to said source means and said cylinder, respectively.

12. Apparatus as set forth in claim 11, wherein is provided a fluid-actuated device requiring a plurality of fluid connections thereto, operably associated with the third boom section, a second plurality of elongated conduit means each provided with a passage, means mechanically interconnecting said second plurality of conduit means in vertically stacked relationship to present a second conduit assembly having a plurality of passages in spaced, superimposed relationship to each other within said second assembly, and means for coupling the opposite ends of the passages of said second assembly to said pressurized fluid source and said device respectively, said second conduit assembly including an intermediate portion disposed in a pair of continuous loops within said open areas between said sections, each of said loops having stretches lying alongside the interior of the opposed sidewalls of said first and second boom sections, respectively.

* * * * *